United States Patent
Binek et al.

[15] 3,644,743
[45] Feb. 22, 1972

[54] METHOD AND APPARATUS FOR ANALYSING LOW-THERMAL EXCITABLE DISPERSIVE SYSTEMS

[72] Inventors: Bedrich Binek, Prague, Czechoslovakia; Sieglinde Przyborowski; Werner Ullmann, both of Berlin, Germany

[73] Assignee: Ceskoslovenska akademie ved, Prague, Czechoslovakia

[22] Filed: Oct. 22, 1969

[21] Appl. No.: 868,503

Related U.S. Application Data

[62] Continuation-in-part of Ser. No. 592,604, Nov. 7, 1966.

[30] Foreign Application Priority Data

Nov. 6, 1965 Czechoslovakia ...................... 6629/65

[52] U.S. Cl. ............................. 250/218, 239/438, 356/87, 356/187, 431/126
[51] Int. Cl. ....................................................G01n 21/26
[58] Field of Search .......................... 356/87, 187, 74, 85, 86; 250/218; 23/253 PC; 239/423, 428; 431/126

[56] References Cited

UNITED STATES PATENTS

| | | |
|---|---|---|
| 2,664,779 | 1/1954 | White..............................356/87 UX |
| 2,730,005 | 1/1956 | Vonnegut.........................356/87 UX |
| 3,208,333 | 8/1965 | Gilbert............................356/87 X |
| 3,486,827 | 12/1964 | Binek...............................356/87 X |
| 3,298,785 | 1/1967 | Reul.................................356/87 X |

OTHER PUBLICATIONS

Gaydon, A. G. et al., Spectra Absorption spectra of Low-Pressure Flames," Proceedings of the Royal Society of London, Ser: A Vol. 25b, No. 1286, July 5, 1960, pp. 323–333.

Primary Examiner—James W. Lawrence
Assistant Examiner—P. C. Nelms
Attorney—Richard Low and Murray Schaffer

[57] ABSTRACT

An analyzer for aerosols has a transparent heating chamber in which a mixture of the aerosol to be analyzed and of a dilutent is heated to the emission temperature of the dispersee particles in the aerosol, the dilution being sufficient to produce sequential light pulses from the emitting particles. The pulses of a desired wavelength are transmitted through a filter to a photomultiplier whose output pulses are analyzed in a known manner to obtain data on concentration, size distribution and composition of the dispersed particles.

8 Claims, 2 Drawing Figures

BEDRICH BINEK
SIEGLINDE PRZYBOROWSKI
WERNER ULLMANN
INVENTOR

METHOD AND APPARATUS FOR ANALYSING LOW-THERMAL EXCITABLE DISPERSIVE SYSTEMS

BACKGROUND OF THE INVENTION

The present invention relates to a method and apparatus for analyzing the particulate matter contained in gases, and in particular, to a method and apparatus for determining the physical and chemical properties of aerosol particles.

For some time, such properties as particle concentration, size and distribution as well as the chemical constituents of the particles, contained in aerosols have been determined by well-known processes. Most methods employ some form of separation, using devices such as precipitators, centrifugal separators or similar mechanical means. Another method had been suggested whereby the properties of aerosol particulate matters may be determined through the use of some form of spectrum analyzer. In such devices, the aerosol particles are excited by an external heat source, to a radiation level wherein the particles emit light rays which may be then observed in a conventional manner.

Each of the above known methods have serious drawbacks and disadvantages, amongst which are their low sensitivity to particles in the submicronic region; their general inaccuracy due to a high level of background "noise" radiation inherent; their inability to distinguish between individual particles and conglomerate or adulterated particulate matter; and in the complex and expensive apparatus required for such procedures.

The present invention is directed to a novel method and a novel form of apparatus employing the principle of heat scintillation and radiation emission which overcome the defects of the prior art.

It is an object of this invention to provide a method and apparatus whereby the physical and chemical properties of aerosol particles can be determined with accuracy and efficiency.

It is an object of the present invention to provide a novel method and apparatus wherein the background noise etc., in analyzing particulate matter is reduced significantly so as to have no effect upon the analysis.

It is another object of the present invention to provide a novel method and apparatus wherein very small and even submicronic particles may be analyzed with a great deal of accuracy.

It is yet a further object of the present invention to provide a method and apparatus whereby analysis of individual particles contained in an aerosol spray may be obtained and that individual particles in a continuous sequential manner may also be observed.

Another object of the present invention is to provide a novel method and apparatus for the analysis of aerosols which analysis is free of contaminant factors.

A still further object of the present invention is to provide a novel method and apparatus which is both economical and simple to use.

SUMMARY OF THE INVENTION

According to the present invention, a method and apparatus is provided whereby aerosols are diluted with a pure gas and fed to a heating chamber in which a heating flame or its equivalent is produced. The flame is surrounded by an envelope of a gaseous media and the particles, after being combusted in the flame, are passed therethrough into the gaseous envelope, wherein the particles are caused to emit and radiate light waves. Optical devices located at the exterior of the combustion chamber receive the light rays, and are provided with means for converting the same into electrical current and means for displaying the current as a digital or other readout of informational indicia.

In the preferred form of both method and apparatus, it is desired that the heat source be uniform and lamina in construction so as to have fixed boundary regions, that the aerosol be fed as individual particles sequentially to the heating source. For organic particles, a reducing media constitutes the gaseous envelope, while for nonorganic particles, the envelope is oxygen.

The aforementioned objects of full details and both the method and apparatus follow herein. The various advantages of the present invention will be apparent from the following discussion.

BRIEF SUMMARY OF THE DRAWINGS

The following disclosure makes reference to the accompanying drawings in which.

DISCLOSURE OF INVENTION

The disclosure of the method of the present invention will be made in conjunction with the description of apparatus which may be used in carrying out the particular method. In this manner, both the method and apparatus will be described with conciseness and clarity.

Figure 1:
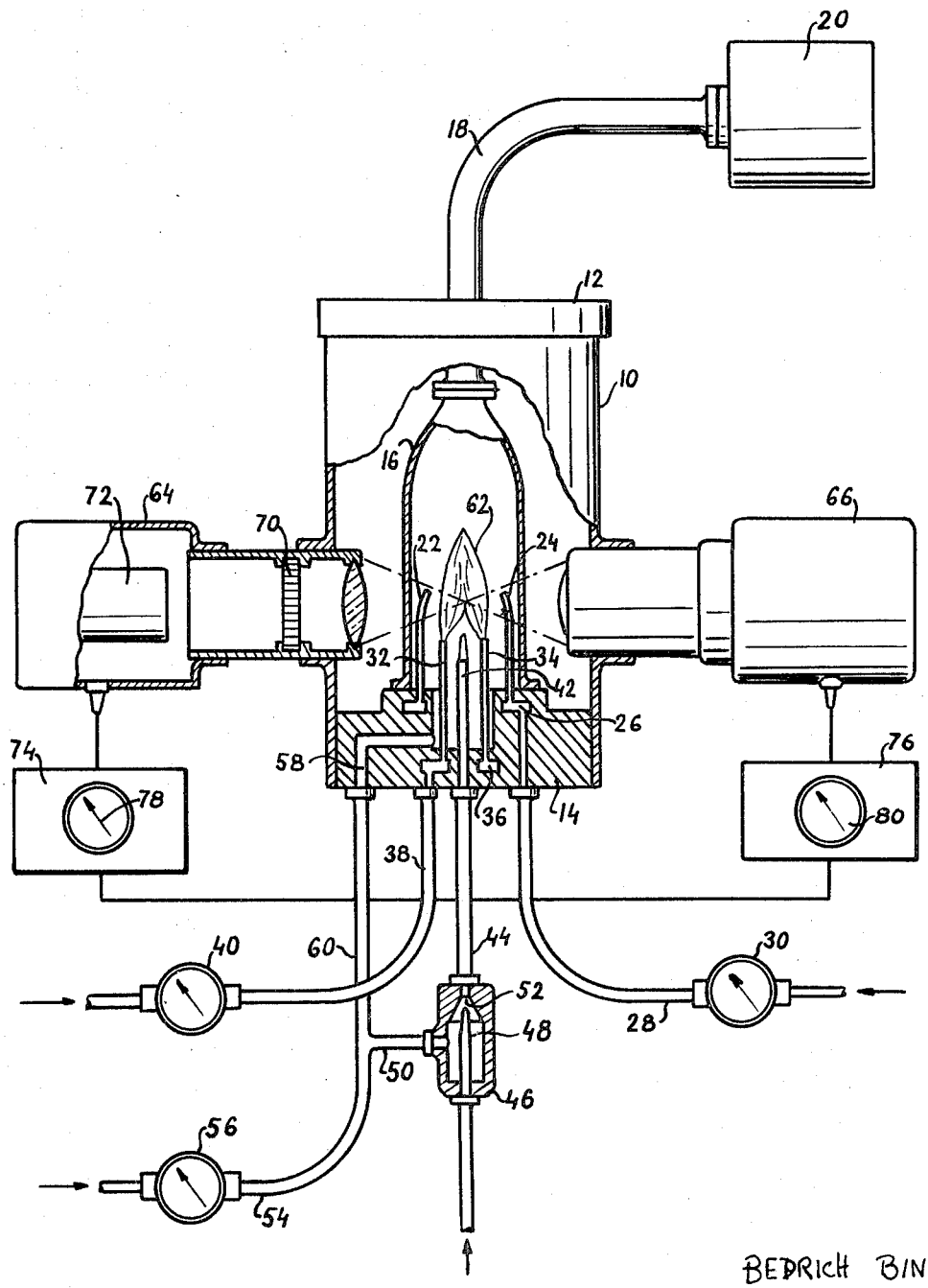
FIG. 1 is a schematic representation, generally in side elevation, of apparatus for carrying out the method of the present invention.

In FIG. 1, the preferred form of the apparatus is shown, the apparatus comprises a cylindrical housing 10 having a cap 12 and a base member 14. The housing may be made of any suitable material such as aluminum, steel or high temperature plastic since, as will be observed later, it serves only to enclose the operative apparatus. Mounted within the housing 10 on the base 14 is a transparent bell-shaped combustion chamber 16 preferably made of high-tempered silica glass. Attached to the upper end of the chamber 16 is a conduit 18 leading to a source of vacuum 20 such as a pump. Suitable controls (not shown) are provided by which the chamber 16 may be continually evacuated to a desired predetermined subatmospheric pressure. The evacuation of the chamber has the advantages of stabilizing the interior thereof, reducing contamination of the chamber by removing combustive waste material and eliminating transient conditions influencing the heating source to be described later.

In practice, the enveloping gas will be selected with regard to the particles to be analyzed in that for organic substances a reducing media is used, while for nonorganic substances, an oxidizing media is employed. Thus, the maximum indication will be obtained.

Mounted into the base 14 and extending upwardly into the interior of the combustion chamber 16 are a pair of diametrically spaced elongated tubular nozzles 22 and 24. The nozzles 22 and 24 communicate at their lower ends with an annulus 26 formed within the base 14. The annulus itself communicates via a conduit 28 to a supply of a suitable enveloping gas (not shown). A flow meter 30 is provided in conduit 28 to regulate the flow of gas from the source to the nozzles 22 and 24.

Also extending into the chamber 16 through the base 14 are a second pair of diametrically opposed nozzles 32 and 34. The nozzles 32 and 34 are located radially inward of the oxygen nozzles 22 and 24 and are also connected to its own annulus 36 to which a conduit 38 is secured. The conduit 38 leads to the nozzles 32 and 34 from a source of a combustive gas (not shown) and is also supplied with a flow meter 40 for regulating the flow thereof.

Extending through the center of the base 14 into the chamber 16 is still another nozzle 42 to which is fastened a conduit 44. The conduit 44 leads from a diluting chamber 46 comprising a cylindrical member having a pair of inlets 48 and 50 and an outlet 52. The outlet 52 is actually connected to the conduit 44. The inlet 48 comprises the end of a conduit leading from a source of aerosol to be tested (not shown). The second inlet 50 is connected to a source of pure gas, preferably air, (not shown) via a conduit 54. The conduit 54 is provided with a flow meter 56 regulating the flow of gas to the diluter 46. Suitable controls are provided for the gas supply so that at proper rates of feed of both air and aerosol, a predetermined dilution of aerosol particles can be fed directly to the nozzle 42 through the conduit 44.

Communicating further with the interior of the combustion chamber 16 is a bore 58 extending through the base 14. The bore 58 is connected to a conduit 60 which branches from the pure gas supply conduit 54 so that the pure gas can simultaneously be supplied to the interior of the combustion chamber. As seen in FIG. 1, the outlet of the bore 58 is adjacent the lower end of the combustion gas nozzles 22 and 24.

The enveloping gas supply nozzles 22 and 24 are arranged so that their outlets are somewhat above the outlet ends of the combustion gas nozzles 32 and 34. The nozzles 22 and 24 are furthermore curved radially inwardly so that the incoming oxygen flow tends to direct the flame created by the combustion gas and arising from nozzles 32 and 34 into a tapered pointed flame as 62 as seen in FIG. 1. The various nozzles are arranged furthermore so that the resultant flame 62 is in fact a microflame having precisely defined regions of burn and boundary surfaces emanating from the two nozzles 32 and 34 actually providing a lamina-heating source. The aerosol nozzle 42 is arranged with its outlet end substantially at the level of the outlet end of the combustion gas nozzles 32 and 34 so as to discharge the disbursed or diluted aerosol at the precise boundary region between the two parts of the lamina flame 62. The lamina shape of the flame 62 and its tapered formation is enhanced in its construction by the continual evacuation of the combustion chamber via the source of vacuum 20.

Suitable control devices, known to those skilled in this art for feeding the precise amounts of combustion gas, dilutent gas, enveloping gas and aerosols, to produce the desired microflame are employed. It is preferred that the pure gas flow rate correspond to the rate at which the combustion gases are fed into the chamber 16 so that the microflame is created under the proper isokinetic and lamina conditions. The introduction of the pure gas and the discharge through the source of vacuum reduces to a minimum transient flame, light and background "noise". In this manner, the aerosol is heated so that its particles combust within the region of the flame and pass through the boundaries thereof into the oxygen envelope surrounding the flame wherein the heated particles then radiate and emit a light signal.

The aerosol nozzle 42, the diluter 46 and source of aerosol (not shown) are also provided with conventional flow control devices which together feed to the combustion chamber a sequential stream of individual particles from which the aerosol is constituted. Dilution coupled with a predetermined rate of feed is significant in controlling the rate at which the particles are fed. It is an important factor in the present method that individual particles be fed to the flame so that combustion of individual particles occur sequentially. Thus is created in the oxygen envelope a steady stream of sequential light pulses radiating from the combusted particles.

Mounted diametrically opposed to each other and extending radially into the housing 10 in an axial position level with the flame 62 are a pair of optical systems 64 and 66 each comprising a condenser lens 68, a wavelength filter or monochromator 70 and a photo multiplier 72. The photo multiplier 72 is provided with a cathode (not shown) upon which the image of the radiating particle is received and converted into electrical energy. The electrical energy produced is a pulsed current which is passed to an electronic computing device 74 and 76, respectively associated with each of the optical devices, wherein digital readout or other visual readout may be made as for example upon the meters 78 and 80.

By controlling the various gaseous intakes and the source of combustion, a heat flame 62 is produced which, because of its very small size, is of very low temperature. The ability to maintain the microflame and low temperature occurs because of the subatmospheric condition of the combustion chamber and the control supply of enveloping gas. Consequently, the flame 62 is uniform and stable having lamina formation with fixed boundaries. The flame 62 is surrounded by an envelope of substantially pure gas fed through the nozzles 22 and 24, which causes it to differ radically from the prior art devices and unlike such systems, be most stable, consistent and uniform.

The aerosol mixture to be tested is fed to the center of the flame both at the precise point and at the precise manner so that it enters the flame at the juncture of the interior boundary regions. The aerosol particles enter the burning zone of the flame 62 where they combust, passing through the flame into the gas envelope. In the gas envelope, a second violent reaction takes place and the particle is caused to admit or radiate an intense impulse of a spectral character. Even particles which are difficult to oxidize or disassociate, such as silicon dioxide ($SiO_2$) may be caused at least to glow within an oxygen enveloping gas and radiate an impulse without breaking apart (black body radiation). Organic particles however break apart easily, achieving high reduction ratios and the softest of organic particles form numerous smaller particles radiating a total impulse of intensity which is greater than would be expected from the initial or whole form of the particle. Consequently, a reducing media is preferred.

The surrounding gas envelope comprises the zone of observation transcended by the optical viewers 64 and 66 respectively; thus the single sequentially fed particles emitting their individual pulses of light can be observed at the moment of a greatest excitation and greatest radiation. Since, of course, different particulate materials exhibit different spectra, the optical device will respond by individually recognizing each pulse.

It will be noted that since the gas envelope is substantially pure and since the flame 62 is uniform and stable, the spectral emission of the particles is substantially without contaminant "noise" or background radiation. Therefore, the observation by the optical device of the individual particle radiation will thus be both accurate and specific with regard to that particular particle. The optical device will thus observe only the radiation effected by the particular particle and consequently be significantly more sensitive than any of the other prior devices since without any extraneous background "noise", even the smallest particles such as sodium (Na) as small as 0.02 $\mu$m. can be analyzed.

The radiation emissions comprise a continuing sequence of individual light pulses of separate origin from corresponding individual particles. The light radiation enters the optical device wherein the filter or monochromator 70 filters only that wavelength which is desired to be transmitted to the photo multiplier 72. It will be obvious that the choice of wavelength filtered by the monochromator will be predetermined for the material and characteristics analyzed. However, the monochromator devices are well known and conventional and should present no problem to those skilled in this art.

In the photoamplifier, which acts as a light transducer, the light radiation is converted to electrical current which is also as a series of pulses and is then passed to the computer 74 where its information is compared with known spectra characteristics or left uncompared to be converted to digital or other visual readout.

In the form of the structure shown in FIG. 1 and its operation, the combustion gas is preferably hydrogen which when mixed with the oxygen produces a hydrogen-oxygen flame. Other gases, of course, are equally suitable as are nongaseous heating sources such as electric arc discharge, laser beams or the like. It is to be remembered that an important factor of this invention also requires that the flame or heating source be at least made up of two parts having fixed boundary regions and capable of a concentrated defined structural formation. While two flames are shown in the preferred device, it will be apparent that additional nozzles may be employed to make a tripartite or multiple flame.

The heating chamber is preferably silica glass as indicated although other materials such as high-tempered plastic of the polytrifluorchlorethylene type may be used. The computer and readout devices may be also modified and replaced with other informational devices such as a pulse amplifier and an oscilloscope.

Figure 2:
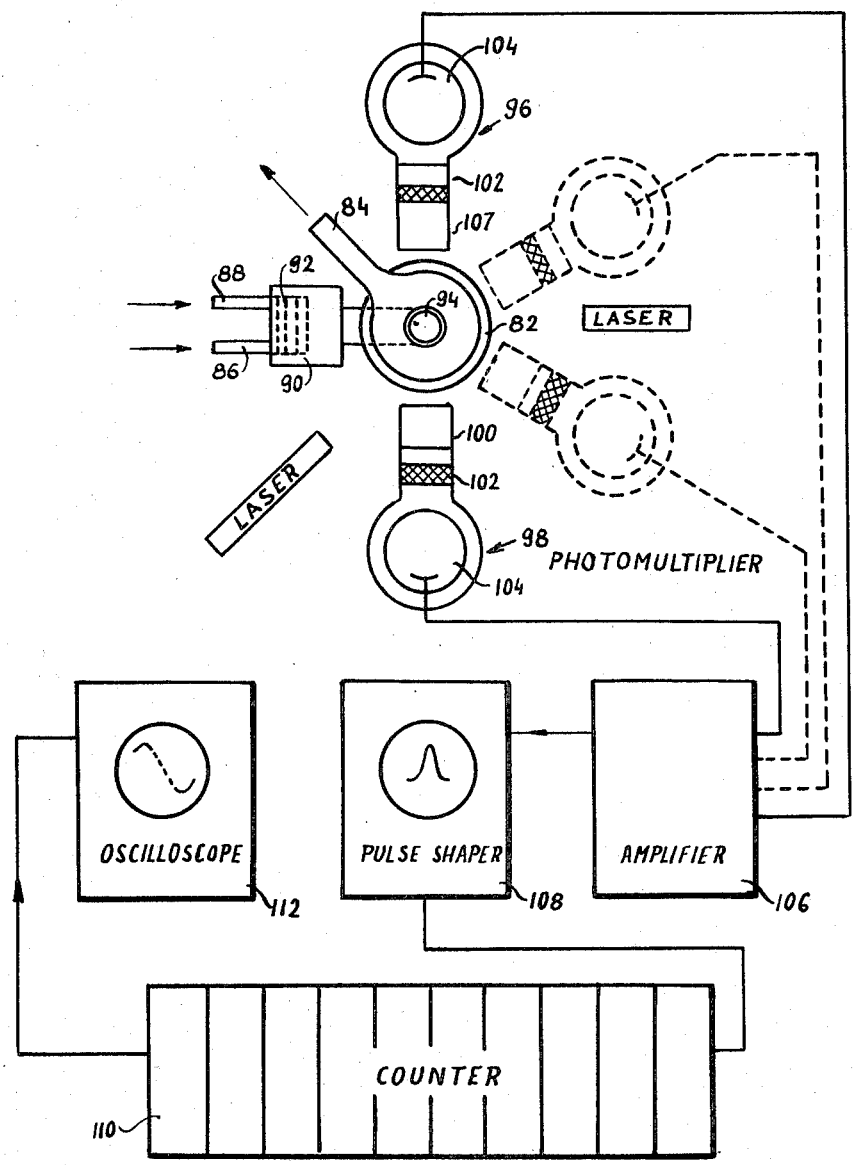
FIG. 2 is a schematic representation, in general plan view, of a second form of apparatus which may be also employed to carry out the present invention.

In FIG. 2, some of the modifications discussed are shown. A heating chamber 82 is provided which is unshielded by an outer housing. The heating chamber 82 is preferably made of the polyfluorchlorethylene plastic material and has a conduit 84 connected to its upper end leading to a source of vacuum (not shown). The aerosol test gas enters through conduit 86 while the pure gaseous dilutant enters through conduit 88. A mixing chamber 90 provided with a plurality of filters 92 joins the conduits 84 and 86 and has a common outlet 94 leading directly to the chamber 82. The interior of the chamber 82 is similar to that shown in FIG. 1 in that an oxygen-hydrogen flame of lamina formation is used. Since the source of heat may be other than a chemical flame, it is shown here as provided by a pair of laser beam devices. The laser beams may be positioned so that they produce dual directional beams producing the lamina heating source required as will be known to those skilled in this art.

The photocells and optical devices 96 and 98 are similar to those shown in FIG. 1 although as seen in this embodiment, they may be movably mounted about the circumference of the chamber 82. Two pairs of optical devices may be used, one being an anticoincidence control for the other. Since the chamber 82 is unsheathed, the mounting may be in any conventional manner. Each optical device comprises a lens 100, a wavelength rectifier or monochromator 102 and the photomultiplier 104. As seen in this embodiment, the photomultiplier is connected to an amplifier 106 which passes the signal to a pulsed shaper 108 thence to a pulse counter 110 from which it may be displayed on an oscilloscope 112. The operation of the apparatus shown in FIG. 2 is exactly the same as the functioning of the apparatus shown in FIG. 1 and for the sake of brevity, will not be repeated herein.

An even more detailed understanding of the present invention and its various applications and modifications to which it may be put will be seen from the following specific examples by which various aerosol gases had their selected particles analyzed.

EXAMPLE 1

Problem:
Determination of the separating efficiency of a particular filtration material.

An aerosol of solid natrium chloride having a particle diameter between 0.05 and 2 $\mu$m. was fed to the apparatus of FIG. 1 and in the mixer 46 mixed with filtered air from conduit 54 and then fed into the combustion chamber 16. The initial natrium chloride concentration was delivered as a control sample using an air hydrogen flame and an optical filter with a maximum permeability of 583.3 m$\mu$m. The initial concentration was determined in 10 ranges of the diameter (from 0.05 to 1 $\mu$m.) as the number of particles per cm$^3$. Subsequently, concentrations of the aerosol were passed through the filter material whose efficiency it was desired to test and similar analyses made. The subsequent concentrations were compared with the initial test sample and the efficiency and degree of filtration effected by the material was found in this manner.

EXAMPLE 2

Problem:
Determination of filtration kinetics in measuring the degree of filtration efficiency.

The present invention was successfully used in measuring rapid variation in the degree of separation during filtration, particularly with particles of submicronic range with diaphragm-type filters. The same method and procedure as used in the preceding Example 1 was employed. However, a cathode-ray tube oscillograph, as shown in FIG. 2, was connected to the photomultiplier so that a graphical illustration of the particle size spectra for the measured aerosol particles was obtained. The images of the aerosol distribution were displayed in particle diameters in 10 ranges similar to the first example with the variations in the degrees of filtration spaced in time intervals of 1 second. In this manner, it was possible to show the effect of variable electrostatic charges on the filtration process.

EXAMPLE 3

Problem:
Determination of retention of aerosol particles in the breathing tract.

A procedure similar to those used in Examples 1 and 2 was undertaken. However, the aerosol was provided from a predetermined source in particle diameters between 0.04 and 1 $\mu$m. at a concentration of $10^2$ particles per cm$^3$. The aerosol was inhaled by a human through suitable valves and exhaled into another aerosol container. Both the aerosol before inhalation and after exhalation were examined in intervals of 1 minute and the particle concentration and size per unit volume were determined in 10 ranges of diameter. The rate of retention for the individual particle sizes were determined from the ratio of the individual measured values obtained from both the inhaled and exhaled aerosols.

EXAMPLE 4

Problem:
Determination of the concentration of particles of strontium in the atmospheric air.

Atmospheric air at the rate of 200 cubic centimeters per minute were fed into the device of the present invention. An oxygen-hydrogen flame and an optical filter with a maximum permeability at a wavelength of 460.7 m$\mu$m. was used. The effect of interfering spectra was limited in accordance with the character of atmospheric pollutions by an anticoincidence network of two additional further optical systems as seen in FIG. 2 including photomultiplier and corresponding optical filters. The particle number and size of the strontium contained within the atmospheric air was determined in 10 ranges between 0.3 and 3 $\mu$m. per unit volume.

EXAMPLE 5

Problem:
Determination of thorium in atmospheric air.

This example is capable of proving the existence of pollutants within the atmosphere. The presence of thorium particles with a diameter of 1 $\mu$m. having an admission wavelength 438 m$\mu$m. using a high-frequency discharge (10 mc. took place between a pair of cool carbon electrodes. The analyzed air volume was 100 cubic centimeters per minute. The existence of aerosol particles such as thorium was orally made through an alarm system, connected to the photomultiplier, in addition to the visual readout.

EXAMPLE 6

Problem:
Determination of the coagulation rate of an aerosol.

Coagulation was measured in a system comprising solid particles of calcium chloride and a liquid lithium chloride. The mixture of the two types of aerosols was contained in an aerosol container with a volume of 3 cubic centimeters. First there was determined the concentration of the particles of calcium chloride and lithium chloride separately using corresponding optical filters having a wavelength of maximum permeability for calcium 554 m$\mu$m. and for lithium 670 m$\mu$m. The two separate systems for determining the concentration of the respective particles were then arranged in coincidence to determine the combined coagulation of the aerosols. This coagulation was then measured in intervals of 1 minute at a rate of 50 cubic centimeters per minute.

EXAMPLE 7

Problem:

Determination of both the number and size of oil particles released into the cooling gaseous media of a turbo compressor in an atomic power plant.

Cooling gas containing oil particles released from the turbo compressor bearings may endanger the reactor performance. Such gas was supplied at a flow rate of 100 cubic centimeters per minute to the apparatus of the present invention. A hydrooxygen flame was adjusted to the height of 3 mm. by employing slightly more oxygen than required. By abrupt combustion of the particles, intense light flashes against the darker background of the oil droplets resulted. The light flashes were evaluated in accordance with their intensities by means of an optical electronic apparatus whereby data about the size and concentration of normal oil aerosol particles had been previously stored. The enveloping gas was a reducing media so that droplets larger than 0.1 $\mu$m. were broken apart. The particle size was measured on the basis of total light flash intensity. A subsequent sample from the same cooling gas was taken. However, this time a filtration material had been used in an attempt to screen out the oil particles. By comparing the second example with the first, the efficiency of the filtration apparatus was observed.

From the foregoing examples, it will be obvious that the present inventive method and apparatus provides distinct advantages in the analysis of aerosol particles over the known prior art and conventional devices. The apparatus is simple and economical, it is easy to use and susceptible to many variations and modifications. The apparatus is highly efficient, the method accurate and virtually instantaneous.

It is to be, of course, understood that the preceding disclosure and the apparatus described is purely by way of illustration only since as will be obvious to those skilled in the art, the present method may of course be practiced in a number of embodiments.

What is claimed is:

1. A method for analyzing particles in aerosols comprising the steps of diluting said particles in a pure gas to separate said particles from each other, feeding said separated particles in a stream of said pure gas sequentially to an environment creating a source of heat at a constant temperature within a predetermined portion of said environment independent of said pure gas, surrounding said source of heat with an envelope of said pure gas, heating said particles at said predetermined portion within said environment reacting said heated particles within said gaseous envelope whereby they emit spectral radiation, optically observing at least a portion of said radiation and removing the gas and combustion products.

2. The method according to claim 1 wherein the aerosol comprises particles of organic material and said gaseous envelope comprises a reducing media.

3. The method according to claim 1 wherein the aerosol is comprised of nonorganic material and said gaseous envelope comprises an oxydizing media.

4. Apparatus for analyzing an aerosol comprising a chamber, means for discharging particles from said chamber, a uniform-temperature heating source located at a predetermined portion in said chamber, means for enveloping said heating source with an envelope of pure gas, means for diluting said particles of aerosol in said pure gas and sequentially feeding the diluted particles to said chamber to be combusted initially by said heating source and then to pass said combusted particles through said envelope wherein they emit spectral radiation, a pair of diametrically opposed photoelectric means arranged adjacent said envelope for converting said spectral radiation to an electrical current, and means for indicating said current by informational indicia.

5. The apparatus for analyzing an aerosol comprising a transparent cylindrical chamber, means for evacuating particles from said chamber, means for diluting said aerosol in a pure gas, means for sequentially feeding said diluted aerosol to said chamber including an outlet nozzle located along the central axis of the chamber, a uniform-temperature heating source located in said chamber independent of said pure gas comprising at least a pair of heat-forming means arranged diametrically opposed about said nozzle, means for enveloping said heating source with an envelope of pure gas comprising at least a pair of nozzles arranged radially outward of said heat-forming means, at least each of the heat-forming means and gas nozzles being arranged substantially along the same axial plane, said particles being combusted initially by said heating source and then passing through said envelope where they emit spectral radiation, said means for evacuating particles including a conduit located axially opposite to the aerosol inlet nozzle so as to discharge said heat, particles and gas from the chamber and at least a pair of photoelectric means mounted diametrically opposed from each other on the exterior of said chamber and substantially along the axial plane of the heat-forming means and the enveloping gas nozzles.

6. The apparatus according to claim 5 including means for controlling the flow of aerosol, gas and heat within said chamber.

7. The apparatus according to claim 6 including means for providing the enveloping gas with an oxydizing media.

8. The apparatus according to claim 6 including means for providing the enveloping gas with a reducing media.

* * * * *